July 1, 1969   E. B. CHILDS ET AL   3,452,586
AUTOMATIC FUEL FILTER MONITOR
Filed March 8, 1967   Sheet 2 of 2

Inventors
Elbert B. Childs
John A.C. Krulish
By Paul H. Keller
Attorney

United States Patent Office 3,452,586
Patented July 1, 1969

---

3,452,586
AUTOMATIC FUEL FILTER MONITOR
Elbert B. Childs, Hastings-on-Hudson, and John A. C. Krulish, Albertson, N.Y., assignors to Mobil Oil Corporation, a corporation of New York
Filed Mar. 8, 1967, Ser. No. 621,478
Int. Cl. G01n 11/00
U.S. Cl. 73—61    14 Claims

ABSTRACT OF THE DISCLOSURE

An apparatus for determining solid contaminants in fluids by pumping the fluid through a durable filter, and monitoring the differential pressure or flow rate across the filter, which is representative of the accumulation of particulate matter. Each test run is completed by flushing the accumulated solids out of the filter by reversing the flow of fluid through the filter. The flushing operation is carried out with pre-filtered fluid. This apparatus operates continuously under the control of a programming device.

Background of the invention

The sensitivity of modern combustion engines and the demand for high quality performance places a premium on the cleanliness of fuels. Therefore the level of contamination by particulate matter which arises in production, storage and transportation must be carefully controlled. Commercially available fuel contamination monitors are of the continuous filter and optical system arrangements. In the former fuel is continuously drawn by a vacuum through a moving strip of filter paper and contamination easily observed by noting the condition of the paper tape (see Patent 2,734,377). The system is fairly bulky and requires continuous servicing; its advantage is its simplicity. The optical systems are more elaborate and expensive, however, they are quite sensitive. The optical instruments measure either water, sediment or both quantitatively, but none of them directly measure the actual filtration characteristics of the fuel which is of primary interest in this invention. For example, a fuel can contain quite a large amount of certain types of particulate contaminant and still provide adequate filtration equipment life. On the other hand, a fuel can contain a microscopic amount of another type of contaminant, possibly below the sensitivity of the instrument, which may result in unsatisfactory filter equipment life.

In addition to the commercial apparatuses referred to, above, several laboratory bench tests are in use. These methods use graded filters to remove particulate matter. In some cases the particulate matter is weighed, or estimated by the color darkening of the filter or the reflectance or absorbance of light. One test uses the elapsed time for filtration of a specified volume of fuel as a measure of contamination. In each test, a new filter membrane is used.

Previous tests for sediment, as indicated above, measure weight, color of sediment, or time of filtration of a specified volume of fuel. In one type of operation, which illustrates the difficulties encountered, an alarm is tripped whenever the vacuum across a yarn wound filter reaches a specified pressure. However, the filter gradually plugs over a long period so that the alarm does not necessarily indicate below-specification product, and periodic replacement of the filter is necessary. Furthermore, if the fuel is not too far off sediment specification, many gallons of fuel from the slip stream are filtered before the restriction at the filter causes a sufficient pressure drop to sound an alarm. Thus many gallons of off-specification product may issue from the main stream to the customer and its quality is known only in retrospect. If the filter is sized smaller to offer enough restriction after only a few gallons of off-specification side stream pass through, clogging is obtained too frequently even for on-specification fuel, since a certain amount of particulate material is always present.

It is therefore an object of this invention to provide a sensitive small-pore fuel filter monitor which has a long life and which provides for automatic flushing of the filter so that it may remain in substantially continuous operation.

Summary of the invention

Fuel is filtered at a preset constant rate through a stainless steel microporous filter for a predetermined period of time. During this operation the differential pressure across the filter is monitored by either a pressure switch or a transducer. If the differential pressure reaches a predetermined level, an alarm is sounded. Alternatively, the level of contamination can be read out from the differential pressure signal from the transducer. At the end of the test run the fuel flow is reversed, the fuel is passed through auxiliary filters to clean it, and the fuel at an increased flow rate is used to flush the filter clean for the next test cycle. The operation is programmed to repeat this cycle. The programmer comprises a cam and follower arrangement which actuates valves to periodically reverse the fuel flow.

In an alternative embodiment the differential pressure across the filter is maintained constant and the change in flow rate is monitored.

Description of specific embodiments

Figure 1:
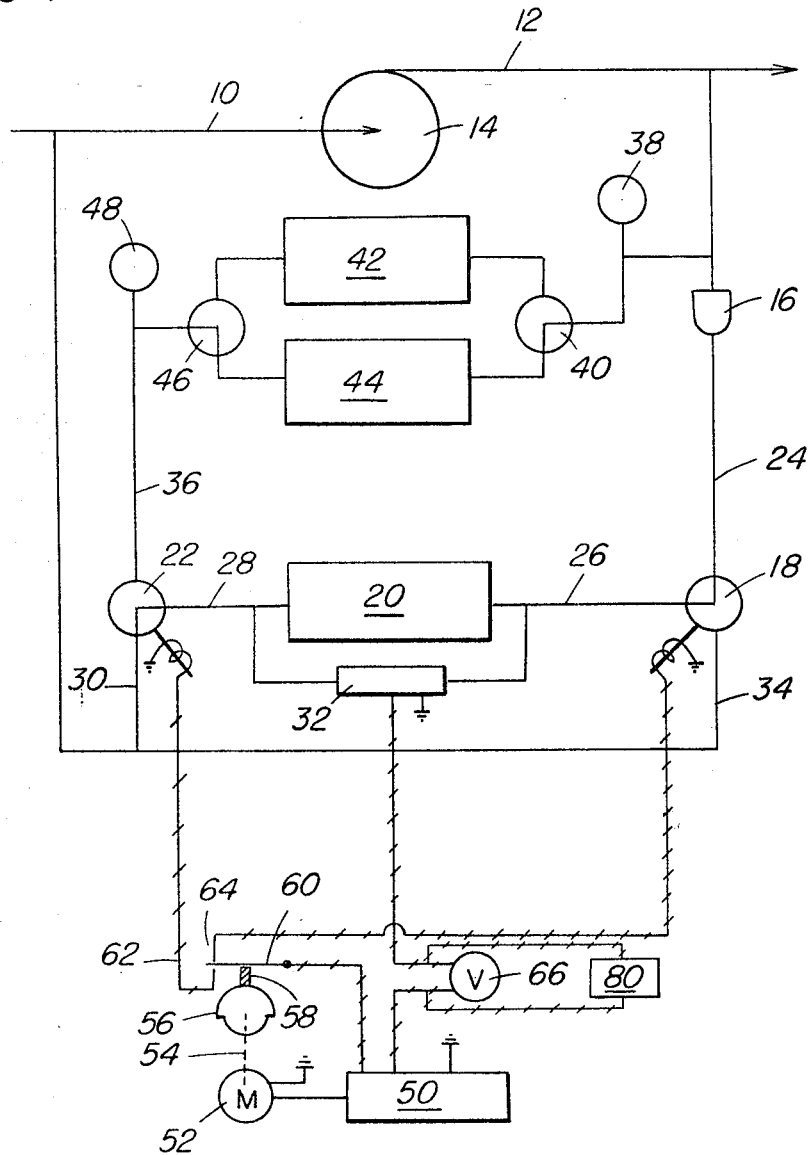
FIGURE 1 is a schematic illustration of the automatic fuel filter monitor of this invention.

As illustrated in FIGURE 1 the fuel flow line is depicted upstream 10 and downstream 12 of the line pump 14. Instead of using the line pump 14 a separate pump of sufficient capacity could be used to provide for a flow of fuel or solvent through the test apparatus. During the monitoring operation fuel flows from line 12 through pressure regulator 16 and solenoid operated valve 18 to the test filter 20. A suitable test filter is a small 5 micron sintered stainless steel filter 2½ inches diameter by 3½ inches long. The filter size and porosity may be chosen within a wide range depending upon the nature of the fluid being monitored and the flow rates employed. Suitably sized filters have pores from 1 to 20 microns, preferably 2 to 10 microns. The test filters may comprise wire mesh screens which are built to stand the flushing operation. Other materials can be used to make the filters provided they can be cleaned by reverse flushing and are durable.

Fuel flow rate during the test cycle is controlled by the pressure flow regulator, which for example, may be set at 1 gallon per minute. From the test filter the fuel flows through solenoid operated valve 22 into the upstream line 10. During the monitoring operation the three-way solenoid actuated valves connect line 24 with line 26 and line 28 with line 30, as depicted. Pressure switch 32 is connected to monitor the differential pressure across the test filter. This pressure switch may be set to be actuated at any desired differential pressure corresponding to a desired contaminant level. For example, the pressure switch may close an alarm relay 80 (discussed below) if the differential pressure exceeds 5 p.s.i., which would correspond to an undesirable filterability characteristics of the test fluid. In addition, a close correlation can be made between the amount of a certain contaminant present and the differential pressure obtained in a test run. Alternatively a pressure transducer may be used in conjunction with a strip chart recorder 80 to furnish continuous data on pressure variations across the test filter.

During the flushing operation valves 18 and 22 are actuated to respectively connect line 26 with 34 and line 28 with 36. During flushing operations fuel flows past gage 38 and through three-way valve 40 to either flush filter 42 or 44 and out through three-way valve 46 past gage 48. These flush filters provide clean fuel which then flows through line 36, valve 22, line 28 and through test filter 20, line 26, valve 18, line 34 and then back to line 10. Under usual operating conditions the reverse flush flow rate may be much higher than during the test cycle, a suitable rate being 3 gallons per minute at 40 p.s.i. line pressure. These flush filters remove dirt, if any, from the fuel before reverse flushing the test filter. Either of the two flush filters may be used cy suitably rotating valves 40 and 46, so that one may be replaced while the unit is operating through the other. The pressure gages 38 and 48 show pressures before and after the flush filters to provide an indication of plugging, to indicate when filter replacement is required. These flush filters can be sized to provide long life even for contamination at levels significantly above specification for the fuel. The flush filters may suitably be 3 micron yarn types, 10 inches long. One micron porosity filters have also been found suitable. The only requirement for these filters is their ability to insure that the product used to flush the test filter is clean.

The major components of this fuel flow monitor are available individually as on-the-shelf items. For example, the differential pressure switch may be that made by United Electric Controls Company, Brooklyn, N.Y., J99K Model 254, Stock No. 9572. The pressure flow regulator is available from Brooks Instrument Company, New York, N.Y., Model 8810. The solenoid valves are available from the Automatic Switch Company, Florham Park, N.J., 830227, Three-way Solenoid Valve, Form U. A suitable 5-micron filter is available from Cuno Engineering Corporation, Meriden, Conn., No. 2230 short, 1B1 housing, with 50155–5 five-micron Poroklean cartridge. The 3-micron filter is available from Commercial Filters Corporation, Lebanon, Ind., CFC Fullflow Duplex Filter, Model BDX1–10–.5, 10 inches with insert E–39R–10SV.

A programmer is provided to continuously switch the filter apparatus between flushing and monitoring modes. In the programming device a voltage source 50 drives a motor 52 which through linkage 54 turns cam 56. Cam follower 58 alternatively actuates the valve solenoids through a connection to a single-pole double-throw switch comprising switch arm 60 which engages contact point 62 or 64. For example, when switch arm 60 engages contact 64 the solenoid of valve 18 is actuated to connect lines 24 with 26 and the solenoid of valve 22 is inactivated so that it connects lines 28 with 30. When switch arm 60 angages contact 62 the solenoid of valve 18 is activated so that line 26 is connected with line 34, and the solenoid of valve 22 is activated so that it connects line 28 with 36.

Power source 50 is also connected to pressure switch 32 and an indicating device, such as voltmeter 66. When the differential pressure across the test filter reaches a predetermined level the pressure switch becomes conducting, and impresses a voltage across 66, with which a recorder or alarm 80 may be associated.

A suitable program for operation of the fuel monitor would include a speed of 12 revolutions per hour for motor 52 which would provide for 2½ minutes of monitoring followed by 2½ minutes of flushing.

Figure 2:
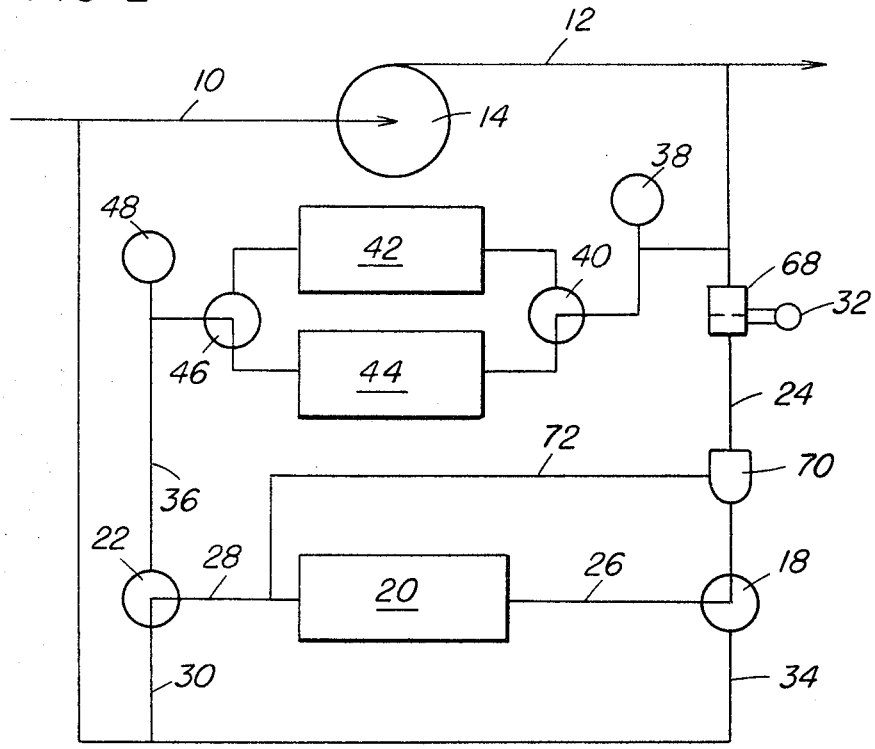
FIGURE 2 is an alternative embodiment of the device of FIGURE 1.

The apparatus of FIGURE 1 detects solid particulate or certain water insoluble gel-types of contamination. The principle of operation is the measurement of the differential pressure across a filter at a constant flow rate. It is possible to change the design to measure the flow rate through a filter at a constant differential pressure. In this case the differential pressure across the filter would be kept just below the pressure which would pull a gel or similar substance through the filter pores. This arrangement would make it possible to detect contaminants which are not detected with the present arrangement because they are pushed through the filter pores. An example would be a partly water soluble gel like sodium dimerate gel. A suitable arrangement for this is shown in FIGURE 2 in which parts in common with FIGURE 1 are labeled by like numerals. The apparatus of FIGURE 2 is substantially the same as that of FIGURE 1 except that a standard orifice 68 is placed upstream of pressure controller 70 in line 24. A pressure tap in line 28 is connected to pressure controller 70 as indicated by 72, and is used to maintain a low differential pressure across the filter. Across the standard orifice a differential pressure transducer or pressure switch 32 similar to that of FIGURE 1 is placed. In this apparatus the flow rate will decrease as contaminants build up on the filter at a constant differential pressure. Correlation of flow rate reduction with contaminant level enables establishment of criterial to sound an alarm if specified contaminant levels are exceeded. The differential pressure switch in conjunction with the standard flow orifice is set to close as the pressure differential falls below a certain level as in the apparatus of FIGURE 1.

Figure 3A:
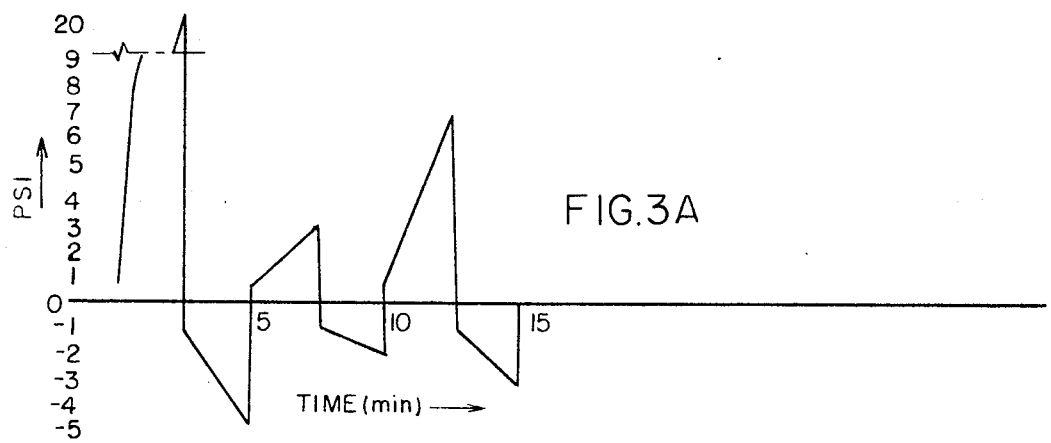
FIGURE 3 illustrates the type of data records made by this invention.

FIGURE 3 illustrates the type of data records which may be made by the use of this invention. For the recording of FIGURE 3A a pressure transducer is used as means 32 in FIGURE 1. The programmer is set to provide a 5-minute cycle, 2½ minutes for monitoring and 2½ minutes for flushing. In FIGURE 3A the abscissa indicates the passage of time and the ordinate indicates the differential pressure across filter 20. Note that the ordinate has been foreshortened between 9 and 20 p.s.i. From 0 to 5 minutes, operation with a heavily contaminated fuel is illustrated; from 5 to 10 minutes, operation with a clean fuel is indicated; and from 10 to 15 minutes, the passage of fuel with an intermediate level of contamination is shown. Note that each monitoring period, at 0, 5 and 10 minutes, starts at approximately ½ p.s.i. which indicates a pressure drop across a relatively clean filter, indicative of good cleansing action during the flushing operation. The relatively high negative differential pressure during the 2½ minute periods of flushing is in part due to the higher flow rate which is used during this portion of the cycle.

Figure 3B:
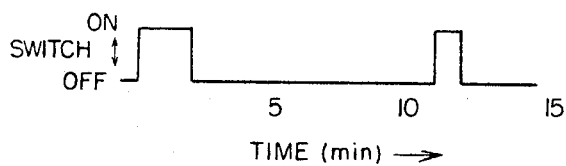

FIGURE 3B illustrates the type of recording obtained when a pressure switch is used as means 32 in FIGURE 1. The length of time during a test cycle that the selected pressure is exceeded is indicative of the amount of contamination. For example, when the heavily contaminated fuel was passed through the filter during the first 2½ minute cycle, the pressure switch was actuated after only ½ minute. During the time that the relatively clean fuel passed through the filter, starting at 5 minutes, the pressure switch remained inactive throughout the cycle. When the fuel for an intermediate level of contamination was used, starting at 10 minutes, the pressure switch was not actuated until 1½ minutes had passed.

The invention has been described in terms of specific embodiments set forth in detail, but it should be understood that these are by way of illustration only and that the invention is not necessarily limited thereto. Alternative constructions will become apparent to those skilled in the art in view of this disclosure, and accordingly modifications of the apparatus and process disclosed here-

What is claimed is:

1. A method for monitoring the contaminant level of a fuel which comprises:
    (1) flowing a fuel through a test filter for a first predetermined period of time and monitoring either the pressure differential across the test filter or the flow rate through the test filter,
    (2) subsequently, for a second predetermined period of time, flowing a fuel through at least one auxiliary cleaning filter and then through said test filter in a direction opposite to fuel flow during said first predetermined period of time, and
    continuously and automatically repeating said steps (1) and (2).

2. The method of claim 1 wherein the flow rate in step (2) is from 2 to 5 times greater than the flow rate in step (1).

3. A system for monitoring the amount of particulate matter in a fluid comprising:
    a source of fluid,
    a test filter having an inlet end and an outlet end,
    at least one auxiliary filter having an inlet end and an outlet end,
    means for directing a sample stream of fluid from said fluid source to either the inlet end of said test filter or the inlet end of said auxiliary filter,
    means for connecting the outlet end of said test filter to either the fluid source or the outlet end of said auxiliary filter,
    means for automatically and alternately (1) actuating said directing means to direct said sample stream to the inlet end of said test filter, and said connecting means to connect the outlet end of said test filter to said fluid source, and (2) actuating said directing means to direct said sample stream to the inlet end of said auxiliary filter, and said connecting means to connect the outlet end of said test filter to the outlet end of said auxiliary filter, and
    means for generating a signal representative of the amount of particulate matter accumulated in said test filter.

4. The system of claim 3 wherein said signal generating means comprises means for monitoring the pressure differential across said test filter.

5. The system of claim 4 wherein said pressure differential means comprises a pressure transducer responsive to the input and output pressure across said test filter.

6. The system of claim 5 further comprising means responsive to said pressure transducer for recording a representation of the amount of particulate matter accumulated in said test filter.

7. The system of claim 5 further comprising means responsive to said pressure transducer for sounding an alarm when the amount of particulate matter accumulated in said test filter reaches a predetermined level.

8. The system of claim 3 further comprising means for maintaining a predetermined pressure differential between the inlet and outlet ends of said test filter, said signal generating means comprising means for monitoring the flow rate of said sample stream through said test filter.

9. The system of claim 8 wherein said pressure maintaining means comprises a pressure controller connected between said fluid source and the inlet end of said test filter and having a feedback connection from a point between the outlet end of said test filter and said fuel source, and wherein said flow rate monitoring means comprises orifice means connected between said pressure controller and said fuel source, and means connected across said orifice for generating a signal representative of said flow rate.

10. The system of claim 9 further comprising means responsive to said flow rate signal for recording a representation of the amount of particulate matter accumulated in said test filter.

11. The system of claim 9 further comprising means for sounding an alarm when said flow rate signal falls to a predetermined value.

12. The system of claim 3 wherein said test filter comprises a filter element having a pore size from 2 to 10 microns.

13. The system of claim 3 wherein said directing means comprises a first three-way solenoid-operated valve interposed between said fluid source and the inlet end of said test filter.

14. The system of claim 13 wherein said connecting means comprises a second three-way solenoid-operated valve interposed between the outlet end of said test filter and said fluid source and the outlet end of said auxiliary filter.

References Cited

UNITED STATES PATENTS

| | | | |
|---|---|---|---|
| 2,954,872 | 10/1960 | Liddell | 210—411 X |
| 2,970,696 | 2/1961 | Mummert | 210—411 X |

LOUIS R. PRINCE, *Primary Examiner.*

J. W. ROSKOS, *Assistant Examiner.*

U.S. Cl. X.R.

116—70; 210—106, 411

PO-1050
(5/69)

UNITED STATES PATENT OFFICE
CERTIFICATE OF CORRECTION

Patent No. 3,452,586          Dated   July 1, 1969

Inventor(s)   ELBERT B. CHILDS and JOHN A.C. KRULISH

It is certified that error appears in the above-identified patent and that said Letters Patent are hereby corrected as shown below:

Column 3, at line 23, for "cy" read --by--; at line 63, for "activated" read --inactivated--. Column 4, at line 30, for "criterial" read --criteria--.

SIGNED AND
SEALED

NOV 18 1969

(SEAL)
Attest:

Edward M. Fletcher, Jr.
Attesting Officer

WILLIAM E. SCHUYLER, JR.
Commissioner of Patents